United States Patent [19]

West et al.

[11] Patent Number: 5,020,470

[45] Date of Patent: Jun. 4, 1991

[54] WET SCRUBBER APPARATUS AND PAINT SPRAYBOOTH IN COMBINATION WITH WET SCRUBBER APPARATUS

[75] Inventors: Kenneth J. West; Andrew Slater, both of Troy, Mich.

[73] Assignee: Haden Schweitzer Corporation, Madison Heights, Mich.

[21] Appl. No.: 402,217

[22] Filed: Aug. 31, 1989

[51] Int. Cl.[5] .......................... B05B 15/12; B01D 47/00

[52] U.S. Cl. ........................................ 118/326; 55/240; 55/DIG. 46; 98/115.2

[58] Field of Search .................... 118/326, 64, DIG. 7; 55/240, 93, 94, DIG. 46; 98/116.2

[56] References Cited

U.S. PATENT DOCUMENTS

| | | | |
|---|---|---|---|
| 3,421,293 | 1/1969 | Halls | 55/240 |
| 4,220,078 | 9/1980 | Walker et al. | 98/115.2 |
| 4,299,602 | 11/1981 | Cordier et al. | 55/DIG. 46 |
| 4,440,554 | 4/1984 | Perry | 98/115.2 |
| 4,612,025 | 9/1986 | Sampey | 98/115.2 |
| 4,704,952 | 11/1987 | Johnson et al. | 55/DIG. 46 |

FOREIGN PATENT DOCUMENTS

| | | | |
|---|---|---|---|
| 2832199 | 2/1979 | Fed. Rep. of Germany | 55/240 |
| 2310161 | 12/1976 | France | 118/326 |

*Primary Examiner*—James C. Housel

*Attorney, Agent, or Firm*—Niro, Scavone, Haller & Niro

[57] ABSTRACT

A wet scrubber is provided for use in combination with a work station in which airborne particulates are generated. The wet scrubber includes a generally horizontal partition which defines a lower boundary of the work station and a discharge structure depending from the partition. A flow of liquid is supplied into the discharge structure, and a flow of air is supplied which will carry the particulate from the work station into and through the discharge structure. A scrubber chamber is also provided into which the discharge structure projects. This chamber includes a receptacle for containing a pool of liquid. The discharge structure itself is constructed to include an elongated inlet channel and a plurality of discrete discharge tubes extending down into the scrubber chamber. The inlet channel has a top, a bottom and a pair of converging sidwalls which depend from the partition at the top of the channel. Each of the discharge tubes has sidewalls and endwalls extending down from the bottom of the channel and together forming a discharge port which is directed at the receptacle within the scrubber chamber. The sidewalls of the inlet channel and the sidewalls of each of the discharge tubes join together or merge to form a generally unobstructed surface, permitting unimpeded flow of the water from the application chamber into the receptable of the scrubber chamber.

12 Claims, 3 Drawing Sheets

WET SCRUBBER APPARATUS AND PAINT SPRAYBOOTH IN COMBINATION WITH WET SCRUBBER APPARATUS

BACKGROUND OF THE INVENTION

The present inventions relates generally to apparatus for use in removing solid or liquid particulates from an air stream. More particularly, the present invention relates to a paint spraybooth facility having a wet scrubbing apparatus to remove paint particulate from the air exhaust stream exiting the spraybooth.

It is well known within the paint industry that automobiles and other mass produced articles may be painted in a spraybooth through which the articles are conveyed and which house the paint spraying equipment. It is essential in the operation of such paint spraybooth facilities that a proper supply of fresh air be maintained and that paint overspray be properly removed from the spraybooth by means of an air exhaust system. As a result, the air exiting the paint spraybooth facility is laden with paint particulate which must be eliminated from the air exhaust stream prior to discharge to the ambient environment.

It is also well known in the paint industry that paint particulate may be effectively removed from the spraybooth facility air exhaust through the use of wet scrubbing apparatus. These wet scrubbing systems typically draw air from the paint application chamber into water flooded continuous slots or discrete discharge tubes disposed in the floor of the paint application chamber. In conventional systems, the water is at least partially disbursed or atomized within the slots or discharge tubes and thereby intimately mixed with the paint-laden air to remove or scrub the paint particulate from the air.

A variety of different wet scrubbing systems have been proposed in recent years for use in combination with paint spraybooth facilities. Examples of such systems are disclosed in U.S. Pat. No. 4,285,270 issued to Donahue; U.S. Pat. No. 4,612,025 issued to Sampey; and U.S. Pat. No. 4,704,952 issued to Johnson et al. While each of these prior art systems is generally satisfactory in removing paint overspray from the air exiting the application chamber of the spraybooth facilities, they nevertheless suffer from disadvantages which continue to trouble the paint finishing industry. For example, paint spraybooths are notoriously noisy thereby posing potential environmental and occupational safety hazards to those working within the facilities. In addition, there is a continuing need to reduce the energy requirements and material requirements, particularly water consumption, necessary for the proper operation of the equipment.

SUMMARY OF THE INVENTION

The present invention is directed to a wet scrubbing apparatus for use in combination with a work station in which airborne particulates are generated and in which a need exists for removal of the particulates from the air exiting the work station. More particularly, the invention is directed to a paint spraybooth facility utilizing a wet scrubber apparatus to remove paint particulate from the air stream exiting the paint application chamber of the spraybooth facility. The apparatus of the present invention overcomes disadvantages associated with the prior art by substantially reducing the sound power level and, therefore, the noise generated by the wet scrubber apparatus while increasing the scrubbing efficiency of the system.

In accordance with the present invention, a wet scrubber is provided for use in combination with a work station in which airborne particulates are generated. The wet scrubber includes a generally horizontal partition which defines a lower boundary of the work station and a discharge structure depending from the partition. Means are provided for supplying a flow of liquid into the discharge structure and for supplying a flow of air carrying the particulate from the work station into and through the discharge structure. A scrubber chamber is also provided into which the discharge structure projects, the chamber including a receptacle for containing a pool of liquid. The discharge structure itself is constructed to include an elongated inlet channel and a plurality of discrete discharge tubes extending down into the scrubber chamber. The inlet channel is formed by a pair of converging sidewalls which depend from the partition at the top of the channel. Each of the discharge tubes has sidewalls and endwalls extending down from the bottom of the channel and together forming a discharge port which is directed at the receptacle within the scrubber chamber.

In accordance with an important feature of the present invention, the discharge structure is configured and constructed to eliminate or minimize the atomization or dispersion of water flowing through it. Thus, the converging inlet channel has a shape which minimizes water dispersion. Moreover, the sidewalls of the inlet channel are generally unobstructed, and the sidewalls of each discharge tube join or merge with the sidewalls of the inlet channel to form a generally unobstructed surface, permitting unimpeded flow of the water from the application chamber through the discharge structure and into the receptacle of the scrubber chamber.

In accordance with a further specific embodiment of the invention, the plurality of discrete discharge tubes are separated by spacing elements which span the opening between the inlet channel sidewalls, with each of the spacing elements being formed in such a manner as to direct a portion of the water flowing into the inlet channel onto the endwalls of the adjacent discharge tubes.

Accordingly, it is an object of the present invention to provide a new and improved scrubbing apparatus finding particularly advantageous use in combination with a work station in which airborne particulates are generated.

Another object of the present invention is to provide a wet scrubber apparatus for use in combination with a paint spraybooth facility which is designed to substantially reduce the sound power level generated by the scrubber apparatus and the noise perceptible within the paint application chamber of the spraybooth facility.

Still another object of the present invention is to provide a wet scrubber apparatus for use in combination with a paint spraybooth facility which requires less static pressure, and thereby less energy, to achieve a given level of paint removal capacity from the air effluent of the paint spraybooth facility.

A still further object of the present invention is to provide a scrubber apparatus for use in combination with a paint spraybooth facility which requires less water consumption to achieve a given level of paint removal from the air exhaust of the paint spraybooth facility.

BRIEF DESCRIPTION OF THE DRAWINGS

The present invention is described with particularity in the appended claims. However, further objects and features of the invention together with its attendant advantages will be more readily understood by reference to the following description, taken in connection with the drawings in which like reference numbers refer to like structural elements and in which:

DETAILED DESCRIPTION OF THE PREFERRED EMBODIMENTS

Figure 1:
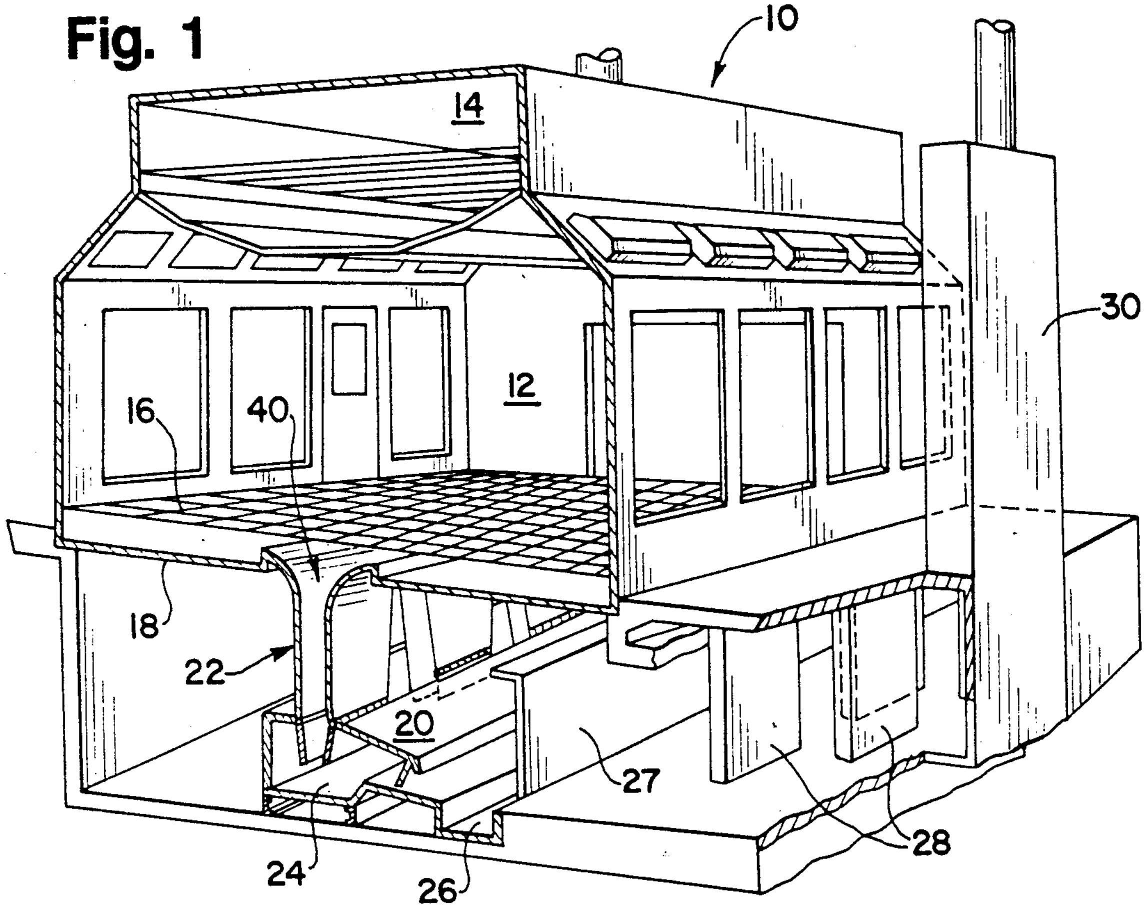
FIG. 1 is a perspective and cross-sectional view illustrating a paint spraybooth facility and a wet scrubber apparatus constructed in accordance with the present invention.
Figure 3:
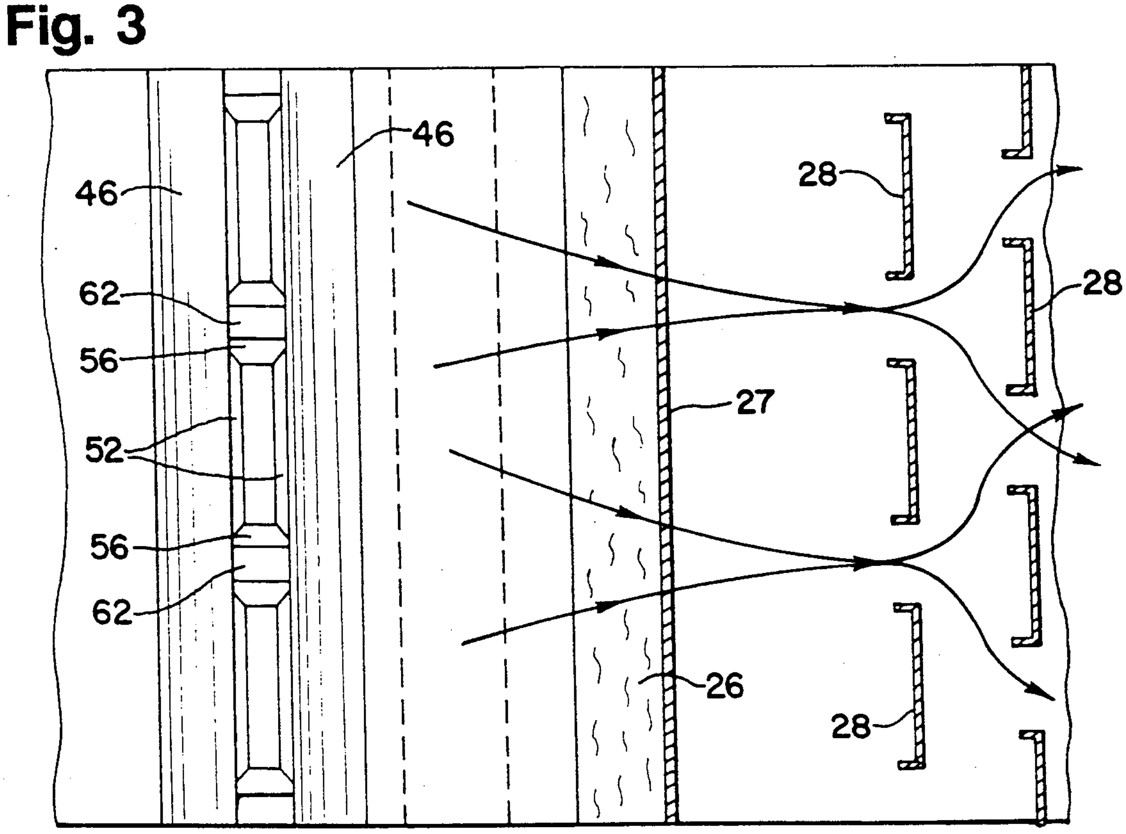
FIG. 3 is a partial plan view taken along line 3—3 of FIG. 2.

With reference now to FIG. 1, a paint spraybooth facility, designated generally as 10, is illustrated and includes an elongated housing or paint application chamber 12 through which automobiles or other articles to be painted are conveyed. It is within application chamber 12 that the paint spray equipment is housed and in which the operators of such equipment are typically located during the painting process. Above the main working area is a supply plenum 14 which introduces fresh air into the paint application chamber 12. The chamber 12 also includes a working floor, conventionally constructed as an open metal grid 16. Positioned below the working floor 16 is a generally horizontal partition 18 which defines the bottom of the paint application chamber and the top of the scrubber chamber 20. The scrubber chamber also includes a centrally disposed and longitudinally extending trough or receptacle 24, a longitudinally extending sluice 26, a vertically upstanding air flow diverter 27 and a plurality of baffles 28. The air exiting scrubber chamber 20 is discharged to the ambient environment via discharge plenum or duct work 30.

Figure 2:
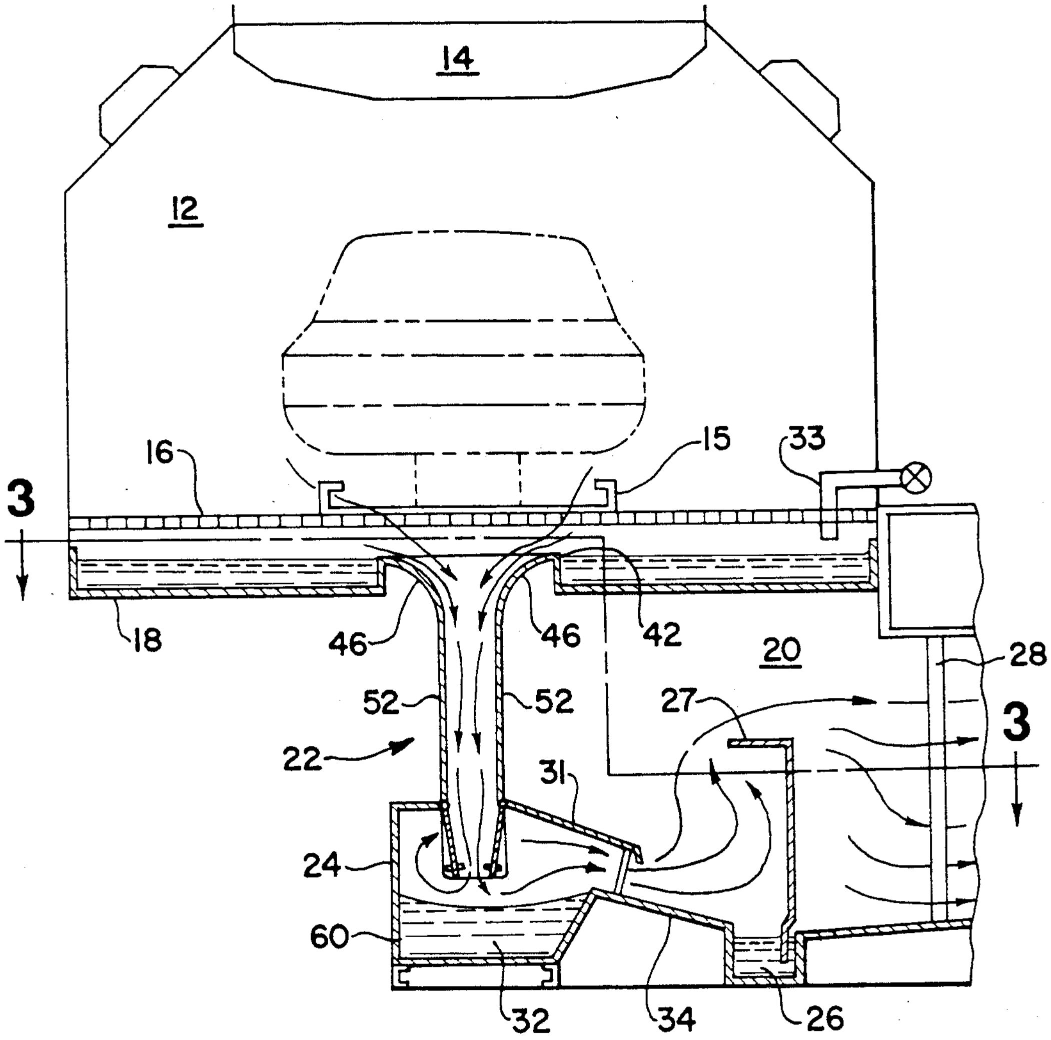
FIG. 2 is a transverse cross-sectional view of the paint spraybooth of FIG. 1 showing a conveyor and an automobile (in phantom) passing through the spraybooth facility.

With reference now to FIG. 2, it can be seen that water is supplied by any one of a number of well known conventional means 33 to the bottom of the application chamber 12 so that the water flows across partition 18 and into and through discharge structure 22. The water accumulates in trough 24 forming a water impact pool 32 whose function and operation will be described more fully below. The overflow from pool 32 traverses a spillway 34 into sluice 26.

The air introduced into application chamber 12 via plenum 14 passes around the article to be sprayed, thereby entraining the paint particulate overspray, and passes down and through discharge structure 22 into scrubber chamber 20. As explained more fully below, the paint particulate carried in the airstream is removed as the air makes it circuitous path through the scrubber apparatus. In addition, water which initially intermixes with the air in the scrubber apparatus is also removed so that a substantially dry and paint free effluent is discharged from the air exhaust duct work 30 into the ambient environment.

Figure 5:
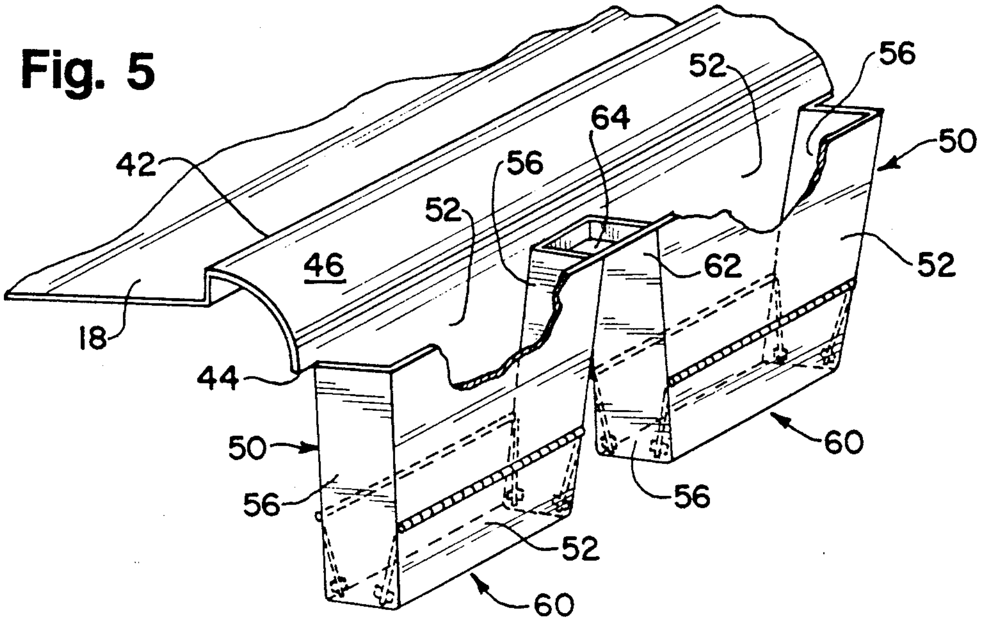
FIG. 5 is a partial perspective view showing in greater detail the components of the discharge structure employed in the wet scrubber apparatus of the present invention.

With reference now to FIGS. 1, 2 and 5, according to the present invention and in order to reduce the energy requirements of the scrubber apparatus and to lessen the noise generated by the apparatus, the discharge structure 22 is provided with an elongated substantially continuous inlet channel 40, having a top 42 and a bottom 44. This continuous inlet channel is defined by a pair of converging sidewalls 46 which depend, or hang down from, the horizontal partition 18. Sidewalls 46 are most preferably of a curved configuration, as illustrated; but other more economically fabricated configurations, such as a V-shape or a series of flat segments equivalent to a curved surface, may also be used. The discharge structure 22 also includes, in accordance with the present invention, a plurality of discrete discharge tubes 50 each having a pair of sidewalls 52 and a pair of endwalls 56 which together form discharge ports, designated as 60, directed toward the receptacle 24 in scrubber chamber 20. The bottom of each inlet channel sidewall 46 merges or joins with the top of each discharge tube sidewall 52 thereby forming a generally unobstructed surface which permits the unimpeded flow of water cascading downward from the application chamber 12 into the receptacle 24 of the scrubber chamber 20.

As illustrated in FIG. 2, the discharge structure 22 is preferably positioned along the longitudinal center line of the application chamber 12 and directly below the shroud 15 which surrounds the bottom of the spraybooth conveyor system. In accordance with the present invention, the discharge tubes 50 have a lateral dimension less than the lateral dimension of the shroud, preferably a dimension no more than one-half the dimension of the shroud. For example, for a shroud having a lateral dimension of approximately 24–30 inches, a preferred lateral dimension for the discharge tubes is approximately 10 inches. This relationship serves to attenuate noise that would otherwise propagate into the application chamber 12.

As most clearly illustrated in FIG. 5, the discrete discharge tubes 50 are each separated along the longitudinal length of the inlet chamber 40 by spacer elements 62 which, most preferably, include a centrally recessed area 64. Thus, water flowing across partition 18 and cascading over the inlet sidewalls will flow, in part, into the recessed area 64 of spacer element 62 forming small ponds between the adjacent discharge tubes 50. The overflow from each of these small ponds is thereby directed downward and over the surfaces of the discharge tube endwalls 56.

Those of skill in the art will recognize that, by virtue of the design of the discharge structure 22 of the present invention, very little or no water dispersal or atomization will take place within the inlet chamber 40 or even within the plurality of discharge tubes 50. This is contrary to the teachings of the prior art wet scrubber systems which depend upon intermixing of the water and air as it passes through the discharge structure. In accordance with the present invention the particulate carried by the airflow entering the discharge structure is removed from that airflow substantially entirely by virtue of the impact of that airflow with the impact pool 32 contained within trough 24 of scrubber chamber 20. Thus, it is only after the air and water enter the scrubber chamber 20 that they become intimately intermixed to effect the efficient scrubbing of particulate from the air. Because there is little or no water dispersal or atomization occurring near the top of the discharge structure 22 or for that matter at any location along its length, the noise which would otherwise be generated by such water dispersal or atomization is substantially eliminated. As a consequence, the sound power emitted from the scrubber chamber 20 into the paint application chamber 12 and the sound level perceptible within the paint application chamber 12 is substantially reduced. For example, paint spraybooth facilities constructed in accordance with the present invention exhibit sound levels of approximately 75–79 dBA, whereas comparable prior art systems exhibit sound levels in excess of 80 dBA and commonly in excess of 85 dBA. Because sound levels are measured on a logarithmic decibel scale, a change of about 3 decibels represents about a doubling of the sound level. Thus, a change from 75 to 85 dBA results in a sound level approximately 8 times louder to the human ear. The present invention, therefore, provides an important occupational health and safety advantage over prior art systems.

In addition, those of ordinary skill in the art will recognize that the efficiency of a scrubber apparatus to remove a given amount of paint particulate from the airstream is related directly to the velocity of that airstream as it exits the discharge ports 60 en route to impacting upon the surface of pool 32. Through the use of the substantially continuous inlet chamber 40 having curved converging sidewalls 46 and by the elimination of any water atomization within the discharge structure 22, the desired exit flow velocity of the airstream can now be achieved with a resistance to flow substantially lower than that of comparable prior art paint spraybooth facilities. In fact, scrubbing apparatus designed in accordance with the present invention have been found to achieve the necessary exit flow velocities with a resistance to flow approximately 25% lower than comparable prior art systems. Thus, substantially less expensive motors, fans and other pressure generating equipment can be employed without sacrificing the scrubbing efficiency of the equipment. Moreover, because the scrubbing is achieved primarily in impact pool 32, the apparatus of the present invention is less sensitive to changes in water flow within tubes 50 or fouling than are prior art devices. As a result, changes in water flow and some fouling of the inlet chamber 40 and discharge tubes 50 does not require maintenance to the extent necessary with prior art systems. Finally, the apparatus of the present invention uses less water than some prior art systems. Preferably, the water volume necessary to achieve the desired efficiency is about 30 gallons per minute per linear foot of paint spraybooth length.

Figure 4:
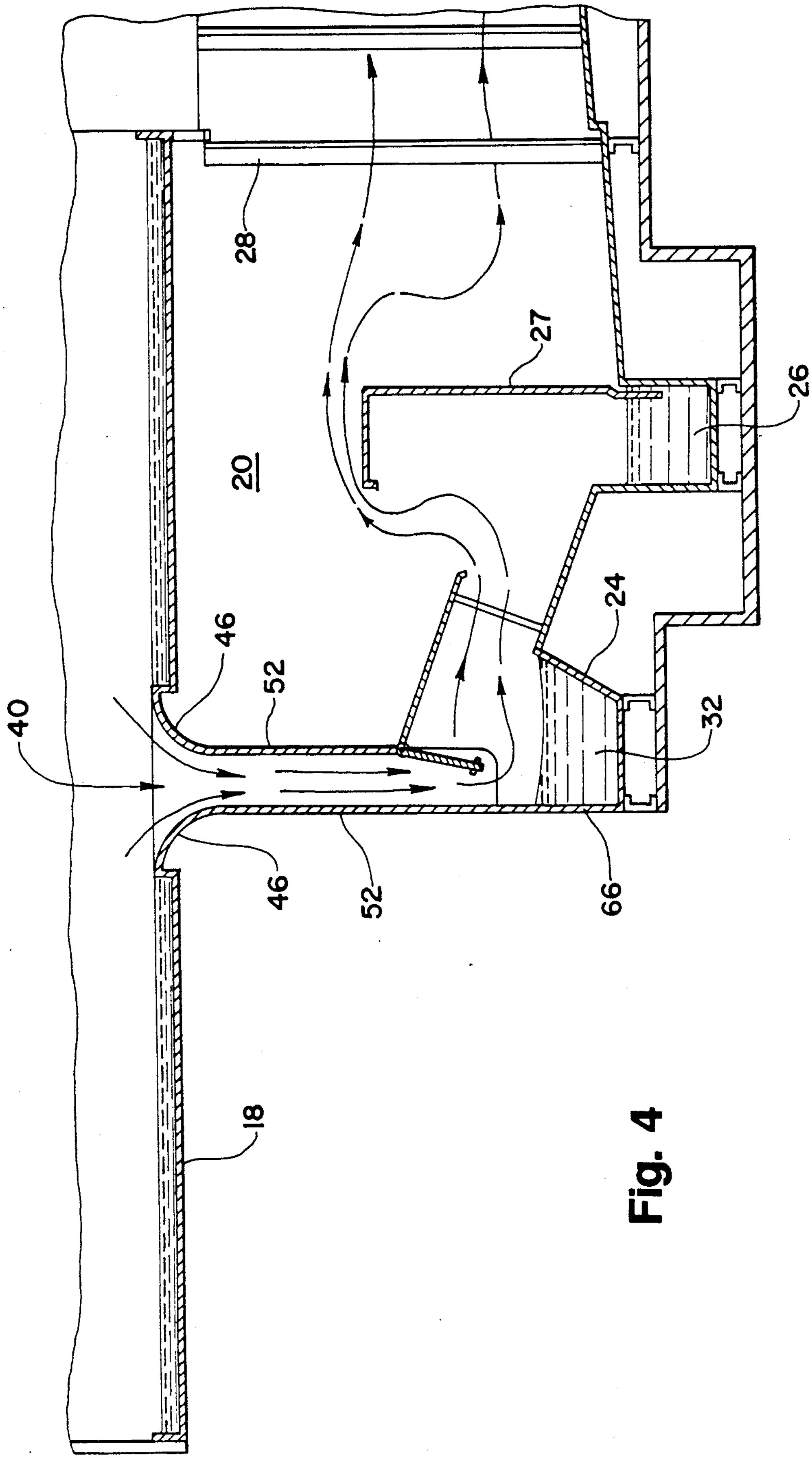
FIG. 4 is a transverse cross-sectional view similar to that of FIG. 2 but showing an alternative embodiment of the scrubbing apparatus of the present invention.

With reference particularly to FIGS. 2 and 4, the longitudinally extending impact pool 32 may be generally centrally disposed within scrubbing chamber 20 so that the air exiting the impact pool 32 will move transversely toward one side of the chamber 20 and ultimately into exit ductwork 30. Preferably, the air must travel a circuitous path from pool 32 until it reaches duct 30 and, for this purpose, a plurality of vertically upstanding baffles 28 may be employed. Moreover, it is particularly preferred that the sluice 26 be positioned between the receptacle 24 and the discharge ductwork and adjacent or proximate to the impact pool 32. A vertically upstanding baffle 27 is positioned at or near the downstream side of sluice 26, while a generally horizontally extending baffle 31 is positioned above pool 32 and over spillway 34. As a consequence, air exiting discharge ports 60 will impact the pool 32, then travel beneath horizontal baffle 31 and up and over vertically upstanding baffle 27 on its way to the discharge duct 30. The location of sluice 26 relatively proximate to the impact pool 32 together with the described location and orientation of baffles 29 and 31 result in the substantial dewatering of the airstream as it passes from the impact pool 32 and is discharged from the scrubber chamber 20. Moreover, any foam that has been created in the scrubbing apparatus will be trapped by baffle 27 and water dropping from the airstream at this location will tend to reduce or minimize the amount of foam present within the scrubber chamber 20.

As illustrated most clearly in FIG. 4, the lateral vertical wall 66 of trough 24 may be made coincident with the sidewalls 52 of the discharge tubes 50. This design substantially reduces the interior surface of the scrubber chamber 20 which is exposed to the water and airstream exhaust coming from application chamber 12. Because these surfaces must often be plated with or constructed from a non-corrosive material, such as stainless steel, the alternative design depicted in FIG. 4 can substantially reduce the cost of the scrubbing apparatus in general. In addition, the unused space immediately adjacent to the scrubber may then be advantageously employed for locating other equipment necessary to the paint finishing operation.

It will be apparent to those skilled in the art that certain changes and modifications may be made in the apparatus and method of the present invention. The description of the preferred embodiments, therefore, are to be considered in all respects as illustrative and not restrictive with regard to the scope of the invention, and all such changes or modifications are intended to be covered by the appended claims.

What is claimed is:

1. A paint spraybooth comprising:

an application chamber in which paint may be applied to an article to be painted;

a partition extending across said application chamber below the article to be painted;

a scrubber chamber located below said partition including a receptacle for containing water;

a discharge structure defining a fluid passageway between said application chamber and said scrubber chamber;

means for supplying water onto said partition and through said discharge structure;

means for conveying air containing paint particulate from said application chamber into and through said discharge structure; and said discharge structure including an elongated inlet channel and a plurality of discrete discharge tubes, said inlet channel having a top and a bottom and converging sidewalls depending from said partition at the top of said channel; said discharge tubes each having sidewalls and endwalls extending from the bottom of said channel and forming a discharge port directed at the receptacle of said scrubber chamber; said inlet sidewalls and said discharge tube sidewalls joining together to form a substantially continuous and generally unobstructed surface to permit unimpeded flow of said water as said water moves from said application chamber into the receptacle of said scrubber chamber.

2. The paint spraybooth of claim 1 wherein said plurality of discharge tubes are spaced along the bottom of said inlet channel.

3. The paint spraybooth of claim 1 wherein said plurality of discharge tubes are separated by spacing elements which extend between said channel sidewalls, said spacing elements being formed to direct a portion of the water flowing down the channel sidewalls onto the discharge tube endwalls.

4. The paint spraybooth of claim 3 wherein each of said spacing elements includes a centrally recessed area to form water ponds between said discharge tubes.

5. The paint spraybooth of claim 1 wherein each of said discharge tubes includes pivotally movable end portions on said tube sidewalls to thereby adjust the cross-sectional area of said discharge posts.

6. The paint spraybooth of claim 1 wherein said receptacle extends longitudinally and coextensively with said discharge structure, and wherein said scrubber chamber further includes an air exhaust passageway along a lateral wall thereof, a sluice positioned between said receptacle and said lateral wall and sufficiently proximate to said receptacle to permit airborne water exiting said pool to enter directly into said sluice.

7. The paint spraybooth of claim 1 further including a conveyor means extending along said inlet channel above the partition for conveying articles through said application chamber and having a shroud surrounding a bottom of said conveyor means, and wherein each of said discharge tubes have a lateral dimension that is less than one-half a lateral dimension of the shroud.

8. A wet scrubber apparatus for use in combination with a work station in which airborne particulates are generated, said apparatus comprising:

a generally horizontal partition and a discharge structure depending from said partition;

means causing a flow of liquid into said discharge structure;

means causing a flow of particulate-laden air from said work station into and through said discharge structure;

a scrubber chamber into which said discharge structure projects including a receptacle to contain a pool of water; and said discharge structure including an elongated inlet channel and a plurality of discrete discharge tubes, said inlet channel having a top and a bottom and curved converging sidewalls depending from said partition at the top of said channel; said discharge tubes each having sidewalls and endwalls extending from the bottom of said channel and forming a discharge port directed at the receptacle of said scrubber chamber; said inlet sidewalls and said discharge tube sidewalls defining a generally unobstructed fluid flow passageway to permit a substantially unimpeded flow of said water as said water moves from said application chamber into the receptacle of said scrubber chamber.

9. A paint spraybooth comprising;

an application chamber in which paint may be applied to an article to be painted;

a partition extending across said application chamber below the article to be painted;

a scrubber chamber located below said partition including a receptacle for containing water;

a discharge structure defining a fluid passageway between said application chamber and said scrubber chamber;

means for supplying water onto said partition and through said discharge structure;

means for conveying air containing paint particulate from said application chamber into and through said discharge structure; and said discharge structure including an elongated inlet channel and a plurality of discrete discharge tubes, said inlet channel having a top and a bottom and converging sidewalls depending from said partition at the top of said channel; said discharge tubes each having sidewalls and endwalls extending from the bottom of said channel and forming a discharge port directed at the receptacle of said scrubber chamber; said inlet sidewalls and said discharge tube sidewalls defining a generally unobstructed fluid flow passageway to permit a substantially unimpeded flow as said water moves from said application chamber into the receptacle of said scrubber chamber; said discharge tubes each being separated by spacing elements which extend between said channel sidewalls, said spacing elements being formed to direct a portion of the water flowing down the channel sidewalls onto the discharge tube endwalls; each of said spacing elements including a centrally recessed area for forming water ponds between said discharge tubes.

10. The paint spraybooth of claim 9 wherein said plurality of discharge tubes are spaced along the bottom of said inlet.

11. The paint spraybooth of claim 9 wherein said discharge tubes include pivotally movable end portions on said tube sidewalls to thereby adjust the cross-sectional area of said discharge ports.

12. The paint spraybooth of claim 9 wherein said receptacle extends longitudinally and coextensively with said discharge structure, and wherein said scrubber chamber further includes an air exhaust passageway along a lateral wall thereof, a sluice positioned between said receptacle and said lateral wall and sufficiently proximate to said receptacle to permit airborne water exiting said pool to enter directly into said sluice.

* * * * *